Patented Oct. 14, 1947

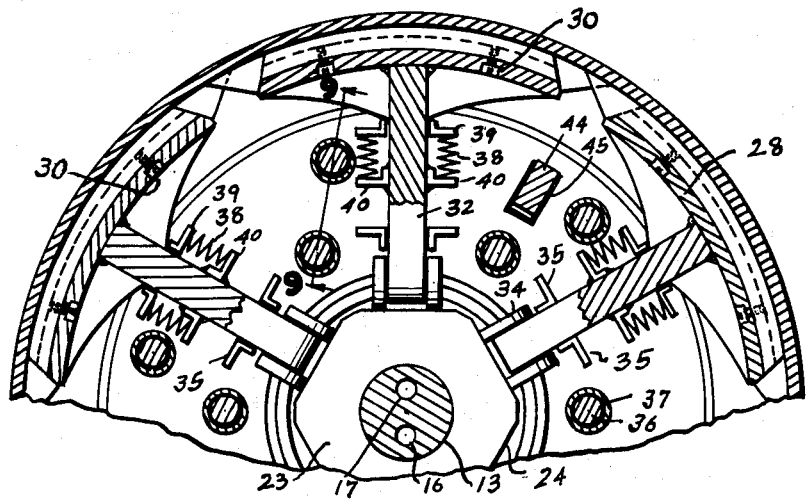
Fig. 7.
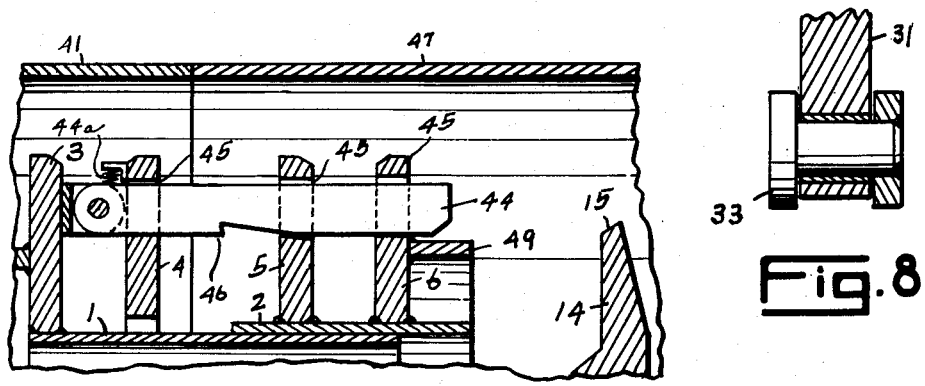
Fig. 10.
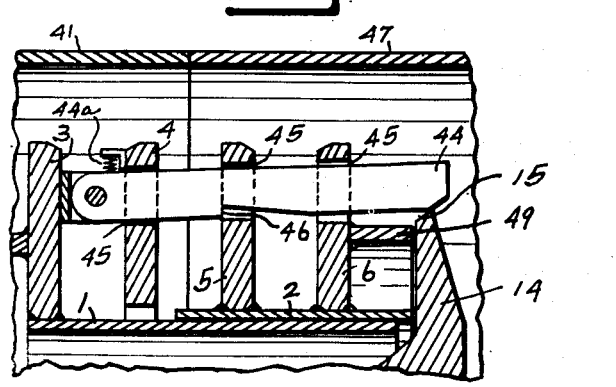
Fig. 11.
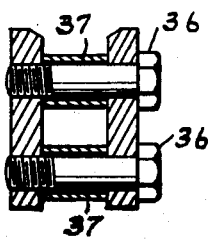
Fig. 8.
Fig. 9.

2,429,053

UNITED STATES PATENT OFFICE 2,429,053

INTERNAL ALIGNMENT FIXTURE AND WELDING CLAMP

Arthur L. Forbes, Jr., Houston, Tex., assignor to Pressure Weld Company, Houston, Tex., a corporation of Delaware Application March 3, 1945, Serial No. 580,903

2 Claims. (Cl. 113—102)

This invention relates to an internal alignment fixture and welding clamp.

An object of the invention is to provide a clamp of the character described adapted to internally engage adjacent ends of pipes, or cylindrical objects, to be united together and to hold said pipes, or objects, in alignment during the welding, or other uniting, process.

Another object of the invention is to provide an internal clamp, of the character described, whereby the abutting ends of the pipe to be welded together may be maintained under pressure during the welding process; that is, whereby said abutting ends may be forced against each other with a constant pressure while being welded together so as to insure a perfect weld.

A further object is to provide an internal clamp which will restore the ends of the pipe, or other objects, to be united together, to their original round shape, if distorted.

With the above and other objects in view the invention has particular relation to certain novel features of construction, operation and arrangement of parts an example of which is given in this specification and illustrated in the accompanying drawings wherein—

Figure 7 shows a fragmentary cross sectional view taken on line 7—7 of Figure 3.

Figure 8 shows an enlarged side elevation, partly in section, of a form of bearing roller employed.

Figure 9 shows a fragmentary cross sectional view taken on the line 9—9 of Figure 7.

Figures 10 and 11 show fragmentary sectional views taken on the line 4—4 of Figure 5, illustrating a latch mechanism shown, respectively, in active and inactive positions and showing the grips removed for the sake of clearness.

Figure 1:
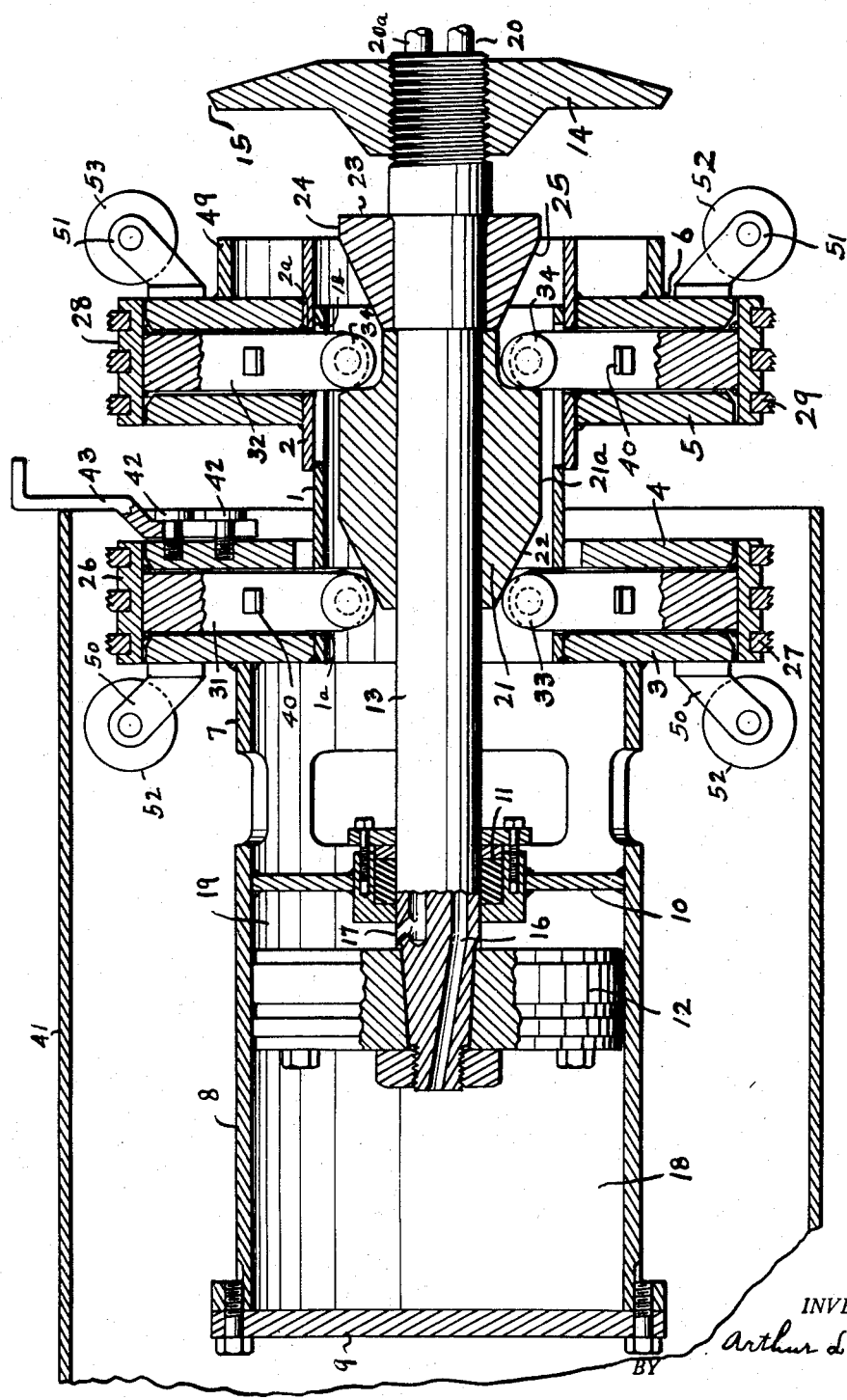
Figure 1 shows a longitudinal, sectional, view of the complete equipment with the parts shown in inactive position.

Referring now more particularly to the drawings wherein like numerals of reference designate similar parts in each of the figures there is a tubular sectional frame comprising the inner and outer telescoping sections 1 and 2 and secured around these respective sections are the annular spaced plates 3, 4, 5, and 6, respectively.

Anchored to and concentric with the forward plate 3 there is a cylindrical, open work, skeleton 7 which is extended forwardly forming the cylinder 8 whose forward end is closed by the head plate 9, secured thereto. The inner end of the cylinder is closed by the transverse plate 10 which supports the stuffing box 11. Within the cylinder there is a piston 12 which is fixed to one end of the piston rod 13. This piston rod works through said stuffing box and extends axially through the frame and screwed on to its other end there is an annular head 14 which is plate-like in form and whose outer margin is formed with an annular outwardly and rearwardly tapering face 15.

The piston rod has two longitudinal channels 16 and 17, the former terminating in the chamber 18 in front of the piston and the other terminating in the chamber 19 behind the piston. Suitable hose as 20 and 20a may be connected into the other ends of these respective channels. Those hoses lead to a suitable source of hydraulic pressure.

Fixed on the piston rod 13 within the frame there is an expander 21 having the external faces 21a and the forward end of this expander is formed with the forwardly and inwardly tapering faces 22 of this expander which are continuations of the faces 21a. This expander may have any selected number of external faces depending on the number of sections of the pipe grips, hereinafter referred to.

Fixed on the piston rod within the frame is also a rear expander, 23 which is spaced rearwardly of the expander 21 and which has the relatively narrow external faces 24 and the forwardly and inwardly tapering faces 25.

Figure 6:
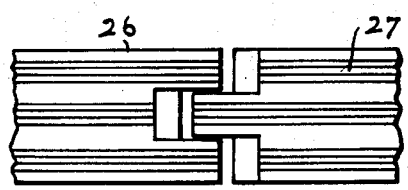
Figure 6 shows a fragmentary plan view of one of the pipe engaging grips.

Around the frame plates 3, 4 is the annular, pipe grapple formed of similar, arcuate, section 26 and counter-sunk into which are the pipe gripping jaws 27. Around the frame plates 5, 6 is the annular, pipe grapple formed of similar arcuate section 28 and counter-sunk into which are pipe gripping jaws 29. These jaws are counter-sunk into the external surfaces of their respective sections and extend circumferentially therearound. They may be secured in place by suitable set screws as 30 so that they may be removed if desired and jaws of different radial dimension substituted therefor so that the clamp may be accommodated to pipes or tubular members of different diameters. The pipe engaging jaws have external teeth which are pitched toward the ends of the pipes to be welded together as clearly shown in figures. As clearly indicated in Figure 6 the adjacent ends of the sections of the pipe grapples are shaped to interfit.

The grapple sections 26 are securely anchored to outer ends of the corresponding thrust bars 31 and the grapple sections 28 are securely anchored to the outer ends of the corresponding thrust bars 32. The thrust bars 31 and 32 extend radially inwardly between the corresponding front and rear plates, as clearly shown in Figures 1 to 4, and rotatably mounted on their inner ends are the spool shaped rollers 33 and 34. The thrust bars 31 work through the bearings 1a in the frame section 1 and the thrust bars 32 work through bearings 2a in the frame section 2 and through the longitudinal slots 1b in the frame section 1 and the thrust bars 31, 32 work between suitable outstanding guides at 35, 35 which are secured to one of the adjacent frame plates. The frame plates are secured together, and in spaced relation to each other, by means of suitable set bolts 36 which are fitted through tubular spacers 37, between the plates, and against whose ends the plates are clamped as shown in Figure 9. The rollers 33, 34 are located within the paths of forward movement of the tapering faces 22, 25 when the pipe grapples are retracted to their inner, or inactive, positions as shown in Figure 1. They are maintained in said inner, inactive position, by means of pressure springs 38, which are interposed between the lugs 39, fixed on one of the adjacent frame plates, and similar lugs 40 fixed on the corresponding thrust bars as illustrated in Figure 7.

With the apparatus assembled as shown in Figure 1 it may be inserted into the end of the pipe line 41 or similar tubular member onto which a section is to be joined. Screwed into the rear side of the frame plate 4 are the set screws 42, 42 which are radially aligned and have enlarged heads which are spaced from the plate 4. There is a spacer bar 43 whose inner end is bifurcated and which may be fitted over the shanks of the set screws 42 and this bar will engage against the end of the pipe 41, as shown in Figure 1, so that the apparatus will be inserted into the pipe 41 only the required distance. The spacer bar 43 may then be removed.

The operating fluid, under pressure, may be applied and relieved through the hose 20, 20a. The application and release of the pressure may be controlled by suitable valves at the source of pressure.

Figure 2:
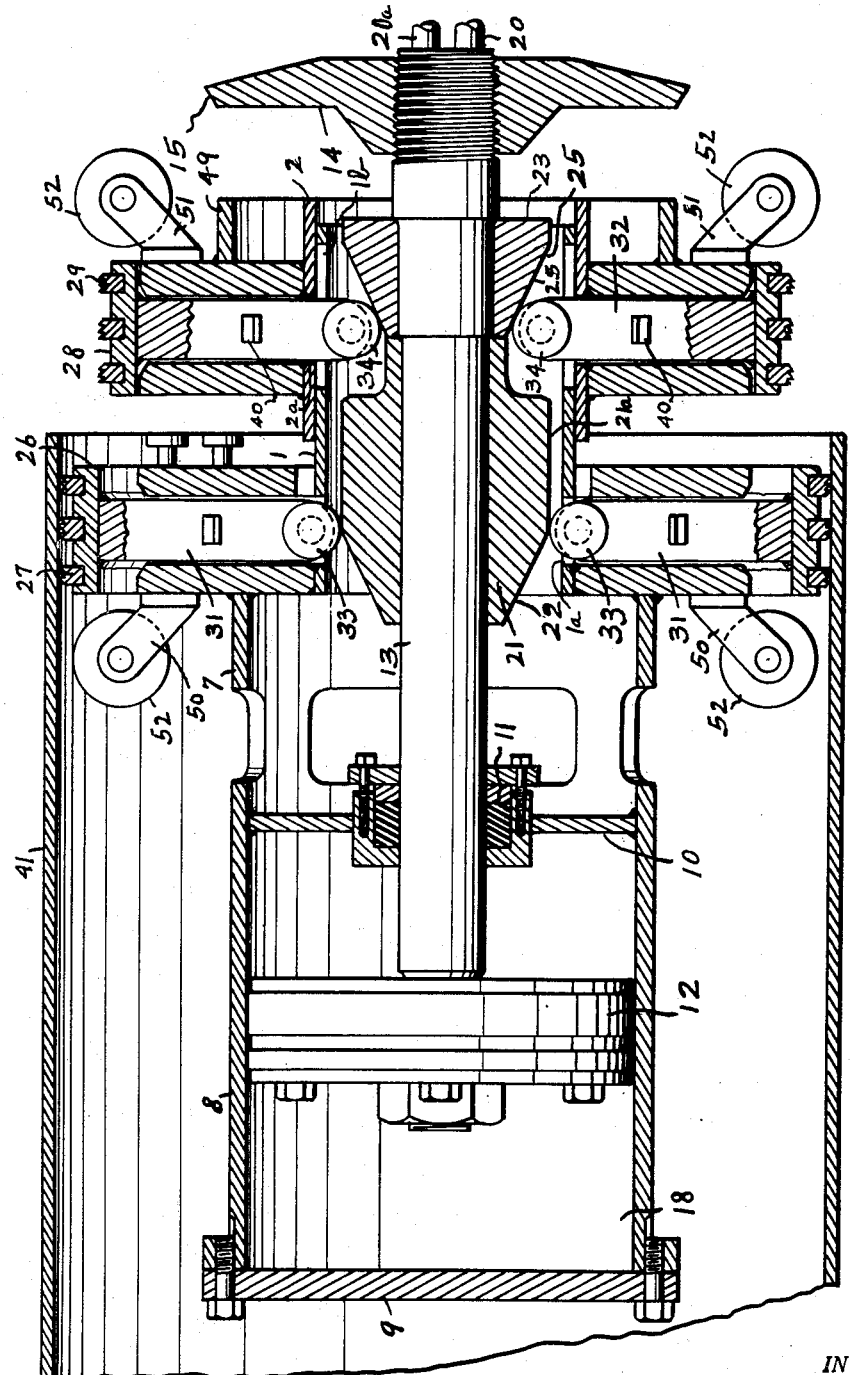
Figure 2 shows a longitudinal, sectional, view showing the clamp initially engaged with the end of one of the pipes, to be welded together, and in readiness to receive the end of the other pipe.

When the apparatus is located in the end of the pipe 41, as above described, operating fluid, under pressure, may be applied through the hose 20a into the chamber 19, and at the same time the fluid in the chamber 18 may be relieved through the hose 20. The piston 12 will be moved forwardly and the expander 21 and 23 will be correspondingly moved forwardly. The initial pressure is sufficient to move the piston and expanders forwardly to the position shown in Figure 2. The tapering face 22, moving between the roller 33, will force the thrust bars 31 radially, outwardly thus bringing the jaws 27 into contact with the pipe. It may be here stated that the outside curvature of the jaws is such that they will define a circle when the grapple is fully expanded. If the end of the pipe is out of round it will be brought to its original circular shape when this grapple is expanded. During the operation just described the expander 23 will also be moved forwardly until its tapering face 25, normally spaced behind the rollers 34, comes into contact with said rollers, as shown in Figure 2. However the thrust bars 32 will not be initially moved outwardly because the pressure of the springs 38 is sufficient to temporarily hold said bars 32 in their inner position so that the section 2 of the frame and the plate and grapple assembly thereon will be moved forwardly as a unit, as the expander 23 moves forwardly.

Figure 4:
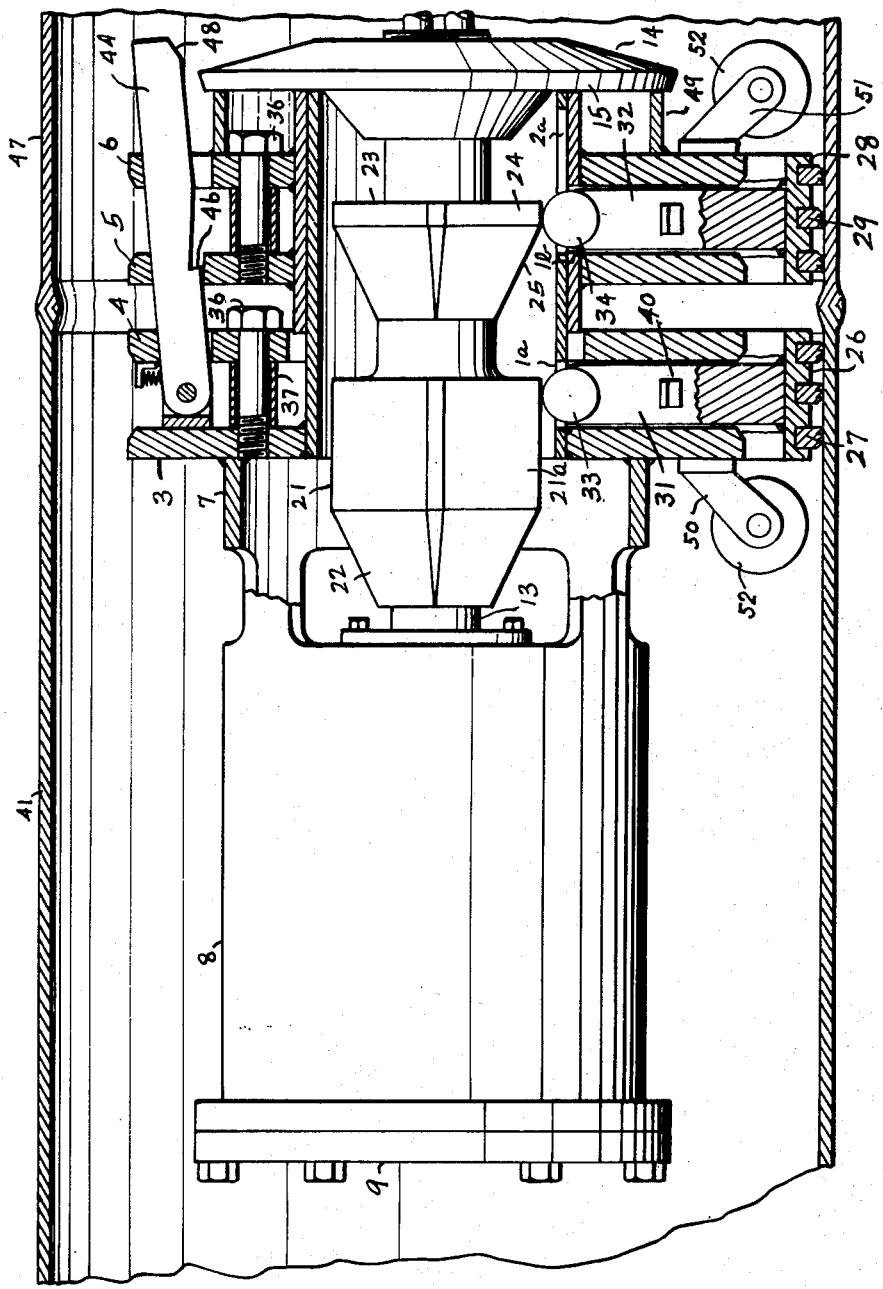
Figure 4 shows a side elevation, partly in section, of the clamp holding pipe ends together, under pressure, during the welding operation, and taken on the line 4—4 of Figure 5.

Pivoted to the rear side of the plate 3 there is a latch 44 which extends rearwardly through radial slots 45 through the plates 4, 5 and 6, said slots being in alignment as shown in Figures 4, 10 and 11. The latch is held inwardly by the pressure of the spring 44a and the inner margin of the latch has the rearwardly facing catch 46 thereon and is tapered behind said catch, as shown, so that upon said initial forward movement of the frame section 2 and the plate assembly thereon, the plate 5 will be engaged by the catch 46 on said frame section 2 and the assembly thereon will be temporarily held against further forward movement.

Figure 3:
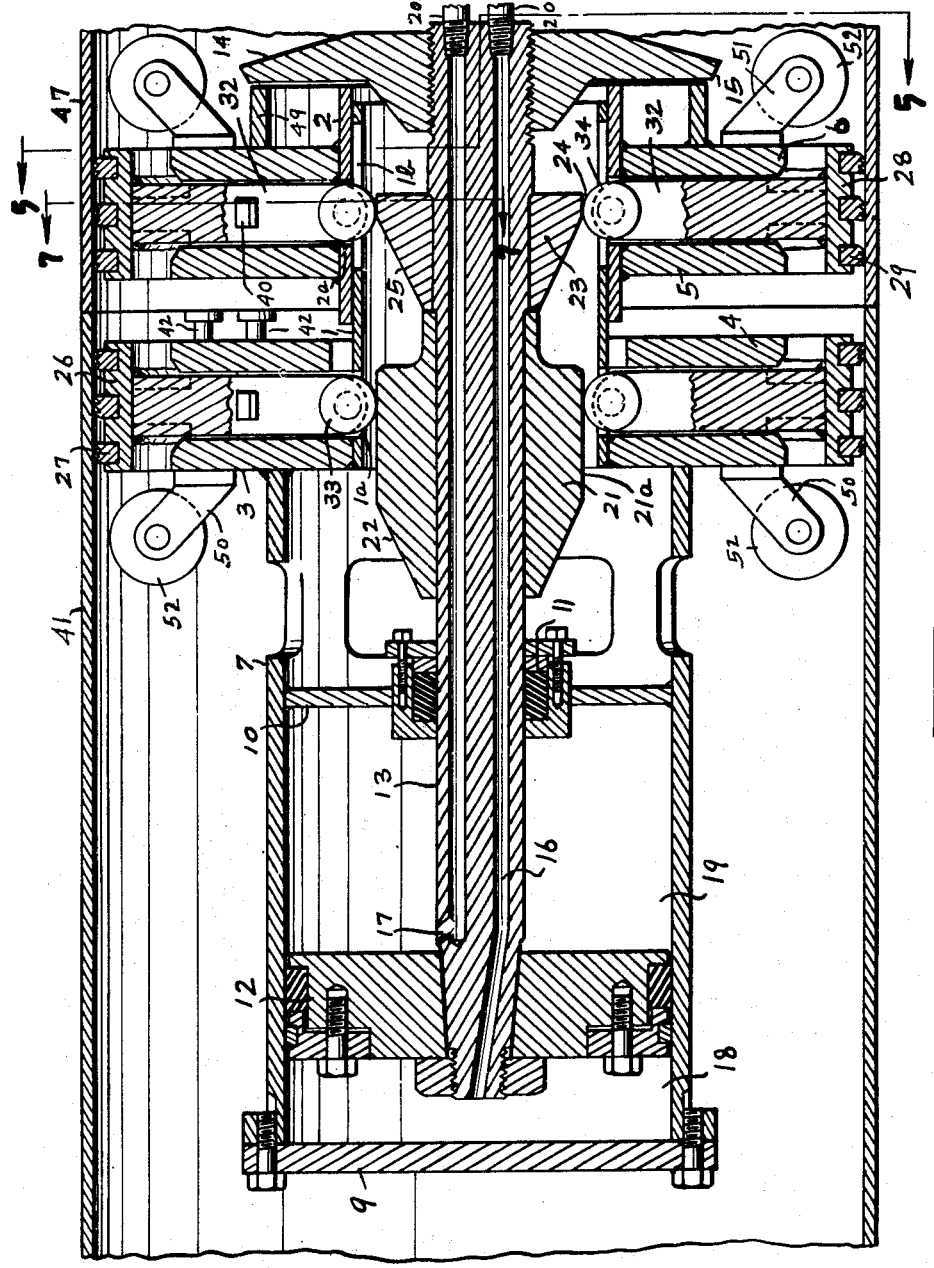
Figure 3 shows a longitudinal, sectional, view of the clamp engaged with the pipe ends and ready for the welding operation, showing portions of the toothed grips removed for the sake of clearness.

The pipe section 47 may then be brought into position to be welded on to the line and while being so positioned the hose 20, 20a should be threaded through said section 47. When the end of the section 47 is brought into abutting relation with the end of the pipe 41, additional pressure may be applied in the chamber 19 and the expanders will be moved on forwardly into the position shown in Figure 3 and the expander faces 25 will force the thrust bars 32 radially outwardly carrying the jaws 29 into engagement with the added section of pipe 47 to be welded on, and thereupon the tapering face 15 of the end plate 14 will engage the tapering face 48 at the free end of the latch 44, and lift said latch thus releasing the catch 46 from plate 5. Securely fastened on the rear face of the plate 6 there is the annular, rearwardly extending, abutment 49 with which said head plate engages as shown in Figures 3 and 4. Upon application of additional pressure in chamber 19 the piston, piston rod and head plate 14, will be forced further forward and said plate being in contact with the abutment 49 and the jaws 29 being in engagement with pipe section 47, said section will be forced, under pressure, against the opposing end of pipe 41, as shown in Figure 3 and upon the application of heat to said abutting ends, by oxy-acetylene flames or electrical means, when said abutting ends are brought to a welding temperature, a secure weld will be formed around said abutting ends and they will be welded together as shown in Figure 4.

Figure 5:
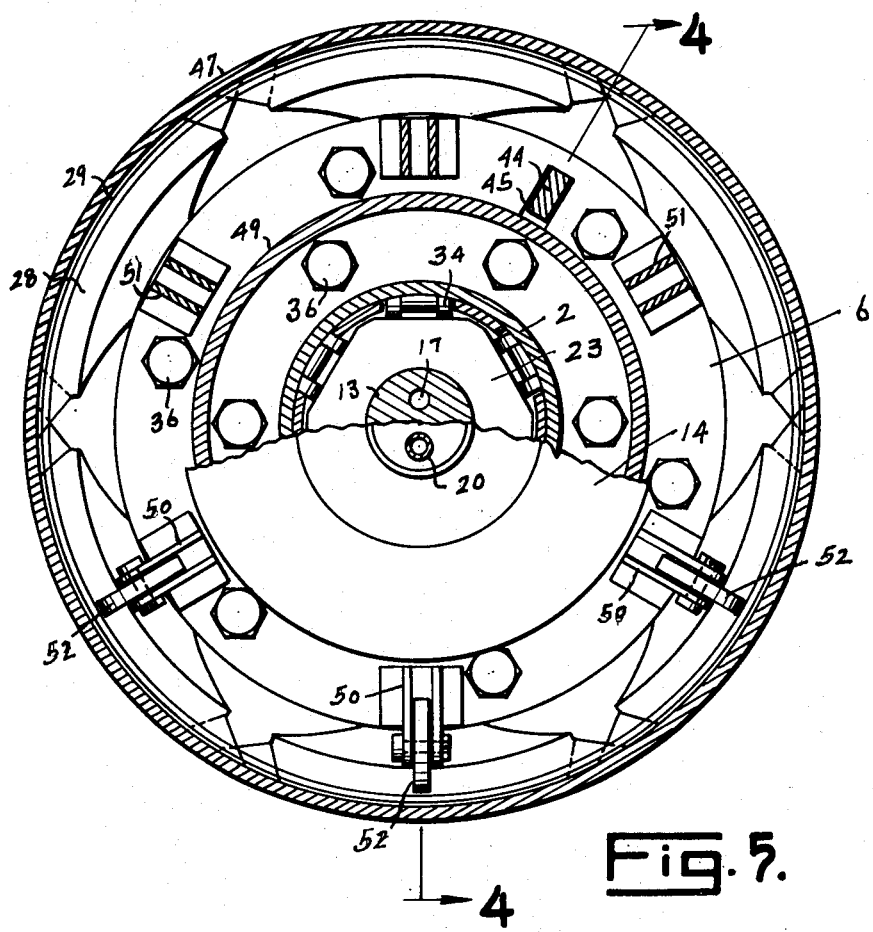
Figure 5 shows a cross sectional view taken on the line 5—5 of Figure 3.

The pressure of the operating may now be reversed, that is it may be applied to the chamber 18 and relieved from the chamber 19, thus moving the piston, piston rod and expanders rearwardly to the position shown in Figure 1. Thereupon the pressure of the springs 38 will retract the grapples to the position shown in Figure 1 and the clamp may then be withdrawn through the welded-on section 47. In order to facilitate this withdrawal the clamp is provided with the forwardly diverging legs 50 and the rearwardly diverging legs 51, arranged in pairs as shown in Figure 5, and between the legs of the respective pairs are mounted the wheels 52, thus forming a carriage on which the equipment may be moved through the pipe section 47.

Figure 12:
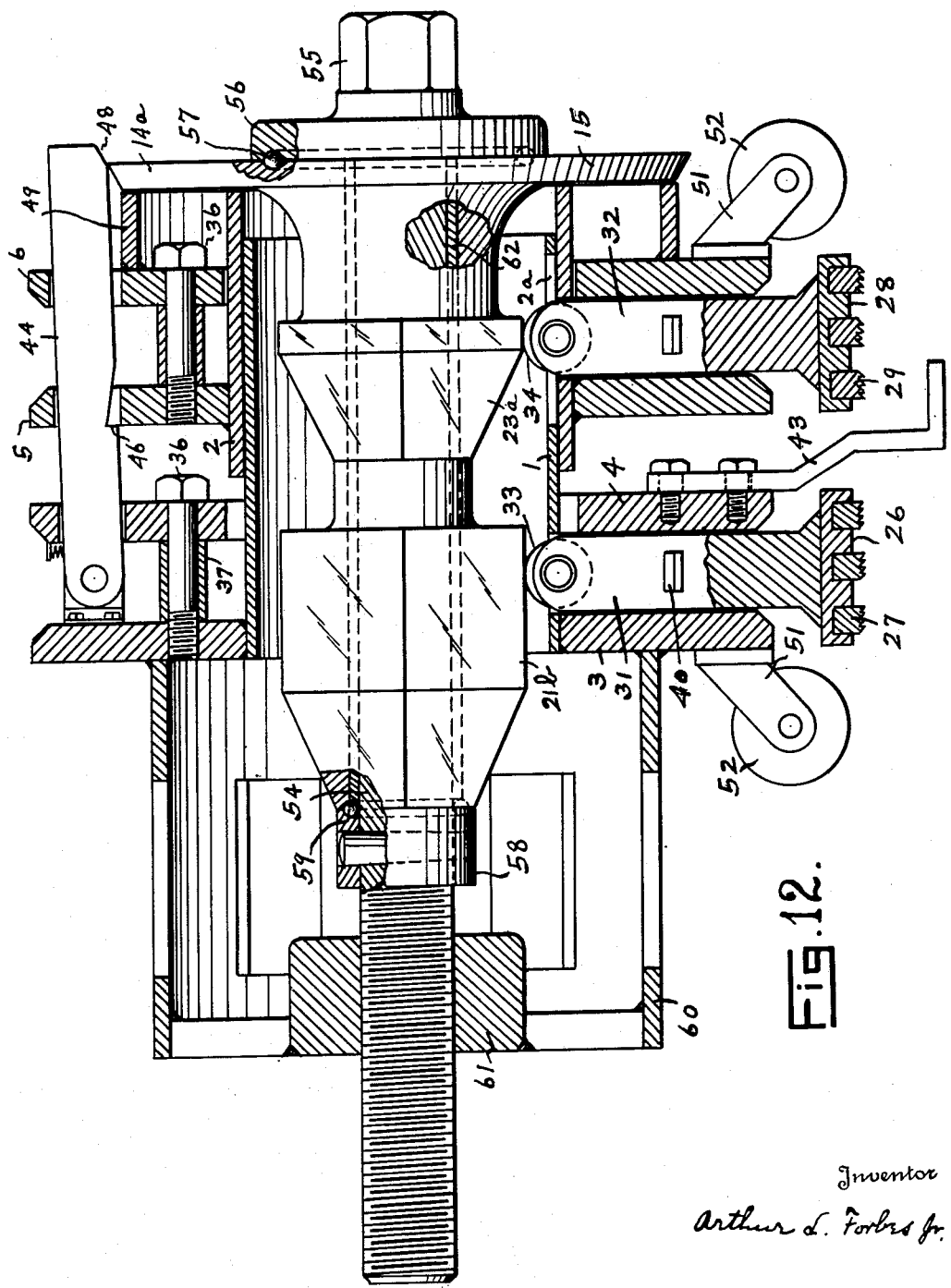
Figure 12 shows a side view, partly in section, illustrating mechanical means for expanding the clamp.

In Figure 12 mechanical means are shown for expanding the pipe engaging and gripping members 26 and 28. In this construction there is a pipe 54 which extends axially through the expanders 21b and 23a. The outer end of this shaft has a polygonal head 55, to receive a wrench by which the shaft may be turned, and secured on this end of the shaft 54 there is a thrust plate 56 with thrust bearings 57 between said plate and the annular head 14a.

Keyed on the shaft 54 adjacent the inner end of the expander 21b there is a thrust sleeve 58 with thrust bearings 59 between said sleeve and the opposing end of the expander 21b.

Fastened to the plate 3 there is an extended tubular cage 60 and fixed to the outer end of this cage there is a nut 61 through which the corresponding end of the shaft 54 is threaded.

A sleeve-like bushing 62, preferably formed of brass or bronze surrounds the shaft 54 within the expanders and head 14.

In other respects the construction shown in Figure 12 is substantially the same as that disclosed in the other figures.

What I claim is:

1. Apparatus of the character described comprising, expansible engaging means adapted to be applied to the inside of tubes whose adjacent ends are to be joined together, said engaging means being arranged in independent assemblies, means for expanding one of said assemblies radially, outwardly, into contact with the inside of one of said tubes, means for thereafter expanding the other of said assemblies radially, outwardly, into contact with the inside of the other of said tubes, means for latching said assemblies to maintain the latter against movement, while being expanded, toward the former and means for releasing said latch means and relatively moving said assemblies to apply endwise force to the tubes to hold said ends together during the joining process.

2. Apparatus of the character described comprising, tube gripping means adapted to be applied to the inside of the tubes whose adjacent ends are to be joined together, said gripping means being arranged in independent expansible assemblies, mechanical means for expanding said assemblies radially outwardly into engagement with the inside of the respective tubes, means for latching the assemblies against relative, axial movement while being expanded, and means for thereafter releasing said latching means and for relatively moving said assemblies, axially, to apply endwise force to the tubes to force said ends together.

ARTHUR L. FORBES, Jr.

REFERENCES CITED

The following references are of record in the file of this patent:

UNITED STATES PATENTS

| Number | Name | Date |
|---|---|---|
| 914,743 | McDonald | Mar. 9, 1909 |
| 1,240,326 | Errett | Sept. 18, 1917 |
| 1,642,825 | Pearce | Sept. 20, 1927 |
| 1,775,311 | Halle | Sept. 9, 1930 |
| 2,054,375 | Halle | Sept. 15, 1936 |
| 2,080,906 | Boyer | May 18, 1937 |
| 2,167,886 | Graham et al. | Aug. 1, 1939 |
| 2,167,896 | Graham et al. | Aug. 1, 1939 |
| 2,344,939 | Bennett | Mar. 28, 1944 |